US009457459B2

(12) United States Patent
Tadokoro et al.

(10) Patent No.: US 9,457,459 B2
(45) Date of Patent: Oct. 4, 2016

(54) POWER TOOL PROVIDED WITH CIRCUIT BOARD

(75) Inventors: Naoki Tadokoro, Ibaraki (JP); Ken Miyazawa, Ibaraki (JP); Hajime Kikuchi, Ibaraki (JP); Toshiaki Koizumi, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 728 days.

(21) Appl. No.: 13/338,000

(22) Filed: Dec. 27, 2011

(65) Prior Publication Data

US 2013/0000934 A1 Jan. 3, 2013

(30) Foreign Application Priority Data

Dec. 28, 2010 (JP) ................................ 2010-292514

(51) Int. Cl.
*B25F 5/00* (2006.01)
*B25F 1/00* (2006.01)
*B25B 21/00* (2006.01)
(Continued)

(52) U.S. Cl.
CPC ............. *B25B 21/00* (2013.01); *B25B 21/026* (2013.01); *B25F 5/00* (2013.01); *B25F 5/021* (2013.01)

(58) Field of Classification Search
CPC ......... H01R 39/40; B25F 5/00; B24B 23/02; B24B 47/12; B25B 23/12; B25B 23/1425; B25B 23/147; H02K 7/14; H02K 7/0073
USPC ......... 173/1–11, 20, 176–183, 213; 307/184; 310/50
See application file for complete search history.

(56) References Cited

U.S. PATENT DOCUMENTS 6,536,536 B1 * 3/2003 Gass et al. ........................ 173/2
7,330,006 B2 2/2008 Iwata et al.
(Continued)

FOREIGN PATENT DOCUMENTS

CN 1775480 A 5/2006
CN 1945936 A 4/2007
(Continued)

OTHER PUBLICATIONS

China Intellectual Property Office office action for patent application JP2011-10444804.7 (Nov. 28, 2013).
(Continued)

*Primary Examiner* — Andrew M Tecco
*Assistant Examiner* — Praachi M Pathak
(74) *Attorney, Agent, or Firm* — Kilpatrick Townsend & Stockton LLP

(57) ABSTRACT

A power tool includes a motor, an impact mechanism, an output unit, a circuit board, a housing, and a power cord. The circuit board includes a power-source circuit board configured to convert alternate current into direct current and a control circuit board. The housing includes a body section, a board accommodating section, and a handle section. The board accommodating section accommodates the circuit board. The handle section has one end portion connected to the body section and another end portion connected to the board accommodating section. The power cord extends from the board accommodating section. The power cord is positioned opposed to the handle section with respect to the board accommodating section. The control circuit board is located at a position close to the handle section in the board accommodating section. The power-source circuit board is located between the control circuit board and the power cord.

10 Claims, 16 Drawing Sheets

(51) Int. Cl.
*B25B 21/02* (2006.01)
*B25F 5/02* (2006.01)

(56) References Cited

U.S. PATENT DOCUMENTS

| | | | | |
|---|---|---|---|---|
| 7,719,146 | B2 | 5/2010 | Takahashi et al. | |
| 8,338,997 | B2 | 12/2012 | Nishikawa | |
| 2008/0135268 | A1 | 6/2008 | Tadokoro et al. | |
| 2009/0229957 | A1* | 9/2009 | Nishimiya | B25F 5/008 200/292 |
| 2010/0163266 | A1 | 7/2010 | Matsunaga et al. | |

FOREIGN PATENT DOCUMENTS

| | | | | |
|---|---|---|---|---|
| CN | 2900047 | Y | 5/2007 | |
| CN | 100999075 | A | 7/2007 | |
| CN | 200942511 | Y | 9/2007 | |
| CN | 101091997 | A | 12/2007 | |
| CN | 101733740 | A | 10/2013 | |
| JP | 58-010471 | A | 1/1983 | |
| JP | 06-233490 | A | 8/1994 | |
| JP | 2003-305667 | A | 10/2003 | |
| JP | 2004-255569 | A | 9/2004 | |
| JP | 2004-296205 | A | 10/2004 | |
| JP | 2005-144564 | A | 6/2005 | |
| JP | 2005-238426 | A | 9/2005 | |
| JP | 2006-102872 | A | 4/2006 | |
| JP | 2007-215336 | A | 8/2007 | |
| JP | 2007-265702 | A | 10/2007 | |
| JP | 2007-283447 | A | 11/2007 | |
| JP | 2007-301703 | A | 11/2007 | |
| JP | 2008126344 | A | 6/2008 | |
| JP | WO 2009118972 | A1 * | 10/2009 | H02K 5/148 |
| JP | 2009-285787 | A | 12/2009 | |
| JP | 2010-012585 | A | 1/2010 | |
| JP | 2010-149251 | A | 7/2010 | |
| JP | 2010-155291 | A | 7/2010 | |
| JP | 2010-173042 | A | 8/2010 | |
| WO | WO 2009118972 | A1 * | 10/2009 | |
| WO | WO2009/145206 | A2 | 12/2009 | |
| WO | WO 2009145206 | A2 * | 12/2009 | |
| WO | WO2010/087235 | A1 | 8/2010 | |

OTHER PUBLICATIONS

China Intellectual Property Office office action for patent application CN201110444804.7 (Nov. 28, 2013).
China Intellectual Property Office office action for patent application CN201110444804.7 (Jul. 11, 2014).
Japan Patent Office office action for patent application JP2010-292514 (Aug. 14, 2014).
China Intellectual Property Office office action for patent application CN201110444804.7 (Feb. 2, 2015).
Japan Patent Office Report of Reconsideration by Examiner for patent application JP2010-292514 (Apr. 2, 2015).
Japan Patent Office office actions JPO patent aplication JP2015-050242 (Jan. 21, 2016).
Japanese Patent Application No. 2010-292514, Office Action, mailed Sep. 14, 2015.

* cited by examiner

POWER TOOL PROVIDED WITH CIRCUIT BOARD

CROSS REFERENCE TO RELATED APPLICATION

This application claims priority from Japanese Patent. Application No. 2010-292514 filed Dec. 28, 2010. The entire content of each of the priority application is incorporated herein by reference.

TECHNICAL FIELD

The invention relates to a power tool, in which a circuit board is provided.

BACKGROUND

A conventional power tool such as an impact driver includes a housing, a commutator motor, a handle, and an output unit (for example, see Japanese Patent Application Publication No. 2008-126344). This power tool is driven by electric power supplied from an AC power source to the commutator motor.

SUMMARY

The inventor of the present invention newly invented an impact driver provided with a brushless motor. The impact driver is further provided with a housing, a handle, a control board for controlling the brushless motor, a power-source circuit board mounted in the housing, and a striking-force display panel connected to the control board. With this impact driver, a rotational speed of the brushless motor can be finely controlled by a microcomputer mounted on the control board.

Hence, there is a need to dispose the striking-force display panel for controlling the rotational speed of the brushless motor, at a position where an operator can check easily and where the panel can be operated while the operator holds the handle.

Further, because the AC power source is used, it is necessary to determine whether a current is applied. However, if a pilot lamp informing an energization is newly provided, the manufacturing costs increase.

Additionally, the power-source circuit board converting AC power to DC power is provided with large-scale elements for removing noises from the power source and the like. Due to requirement of downsizing products, it is necessary to efficiently arrange the brushless motor, the control, the power-source circuit board, large-scale elements, and the like within the housing.

In view of the foregoing, it is an object of the invention to provide a power tool that includes a striking-force display panel provided at a position where an operator can check easily. Another object of the invention is to provide a power tool that includes a pilot lamp while reducing manufacturing costs. Still another object of the invention is to provide a power tool in which each component within the housing is arranged efficiently.

In order to attain above and other objects, the present invention provides a power tool. The power tool including a motor, an impact mechanism, an output unit, a circuit board, a housing, and a power cord. The impact mechanism is driven by the motor. The output unit is connected to the impact mechanism. The circuit board is configured to control the motor and includes a power-source circuit board configured to convert alternate current into direct current, and a control circuit board to which the direct current is supplied. The housing includes a body section, a board accommodating section, and a handle section. The body section accommodates the motor, the impact mechanism, and a part of the output unit. The board accommodating section accommodates the circuit board. The handle section has one end portion connected to the body section and another end portion connected to the board accommodating section. The power cord extends from the board accommodating section and supplies the alternate current to the power-source circuit board. The power cord is positioned opposed to the handle section with respect to the board accommodating section. The control circuit board is located at a position close to the handle section in the board accommodating section, and the power-source circuit board is located between the control circuit board and the power cord.

According to another aspect, the present invention provides a power tool. The power tool includes a motor, an impact mechanism, an output unit, a circuit board, a housing, and a power cord. The impact mechanism is driven by the motor. The output unit is connected to the impact mechanism. The circuit board is configured to control the motor. The circuit board includes a power-source circuit board configured to convert alternate current into direct current and a control circuit board to which the direct current is supplied. The housing includes a body section, a board accommodating section, and a handle section. The body section accommodates the motor, the impact mechanism, and a part of the output unit. The board accommodating section accommodates the circuit board. The handle section has one end portion connected to the body section and another end portion connected to the board accommodating section. The power cord extends from the board accommodating section and supplies the alternate current to the power-source circuit board. The power cord is positioned opposed to the handle section with respect to the board accommodating section. The housing accommodates the motor, the control circuit board, the power-source circuit board, and the power cord in this order.

According to still another aspect, the present invention provides a power tool. The power tool includes a motor, an impact mechanism, an output unit, a circuit board, a housing, a display panel, and a power cord. The impact mechanism is driven by the motor. The output unit is connected to the impact mechanism and configured to drive an end bit mountable thereon. The circuit board is configured to control the motor. The housing includes a body section, a handle section, and a board accommodating section. The body section supports the output unit and extending in an axial direction of the end bit. The handle section has one end portion connected to the body section and another end portion. The handle section extends in a direction across the axial direction. The board accommodating section accommodates the circuit board and is connected to the another end portion of the handle section. The board accommodating section includes a protruding section protruding in the axial direction and has a handle side outer surface. The display panel is configured to display a control state of the motor and located on the handle side outer surface. The power cord extends from the board accommodating section.

According to still another aspect, the present invention provides a power tool. The power tool includes a motor, an impact mechanism, an output unit, a circuit board, a housing, a display panel, a power cord. The impact mechanism is driven by the motor. The output unit is connected to the impact mechanism. The circuit board is configured to control the motor. The housing includes a body section, a handle section, and a board accommodating section. The body section accommodates the motor, the impact mechanism, and a part of the output unit in this order in a first direction. The handle section has one end portion connected to the body section and another end portion. The board accommodating section accommodates the circuit board and is connected to another end portion of the handle section. The board accommodating section includes a protruding section protruding in the first direction and having a handle side outer surface. The display panel is configured to display a controls state of the motor and located on the handle side outer surface. The power cord extends from the board accommodating section.

According to still another aspect, the present invention provide a power tool. The power tool includes a housing, a motor, an impact mechanism, an output unit, a power cord, a display panel, and a control unit. The motor is accommodated in the housing. The impact mechanism is driven by the motor. The output unit is connected to the impact mechanism and protrudes from the housing. The power cord is connected to the housing. The display panel is configured to display a control state of the motor. The control unit is configured to turn on the display panel while a power source is supplied to the power cord.

BRIEF DESCRIPTION OF THE DRAWINGS

The particular features and advantages of the invention as well as other objects will become apparent from the following description taken in connection with the accompanying drawings, in which.

DETAILED DESCRIPTION

An impact driver 1 embodying a power tool according to an embodiment of the invention will be described while referring to FIGS. 1 through 13.

Figure 1:
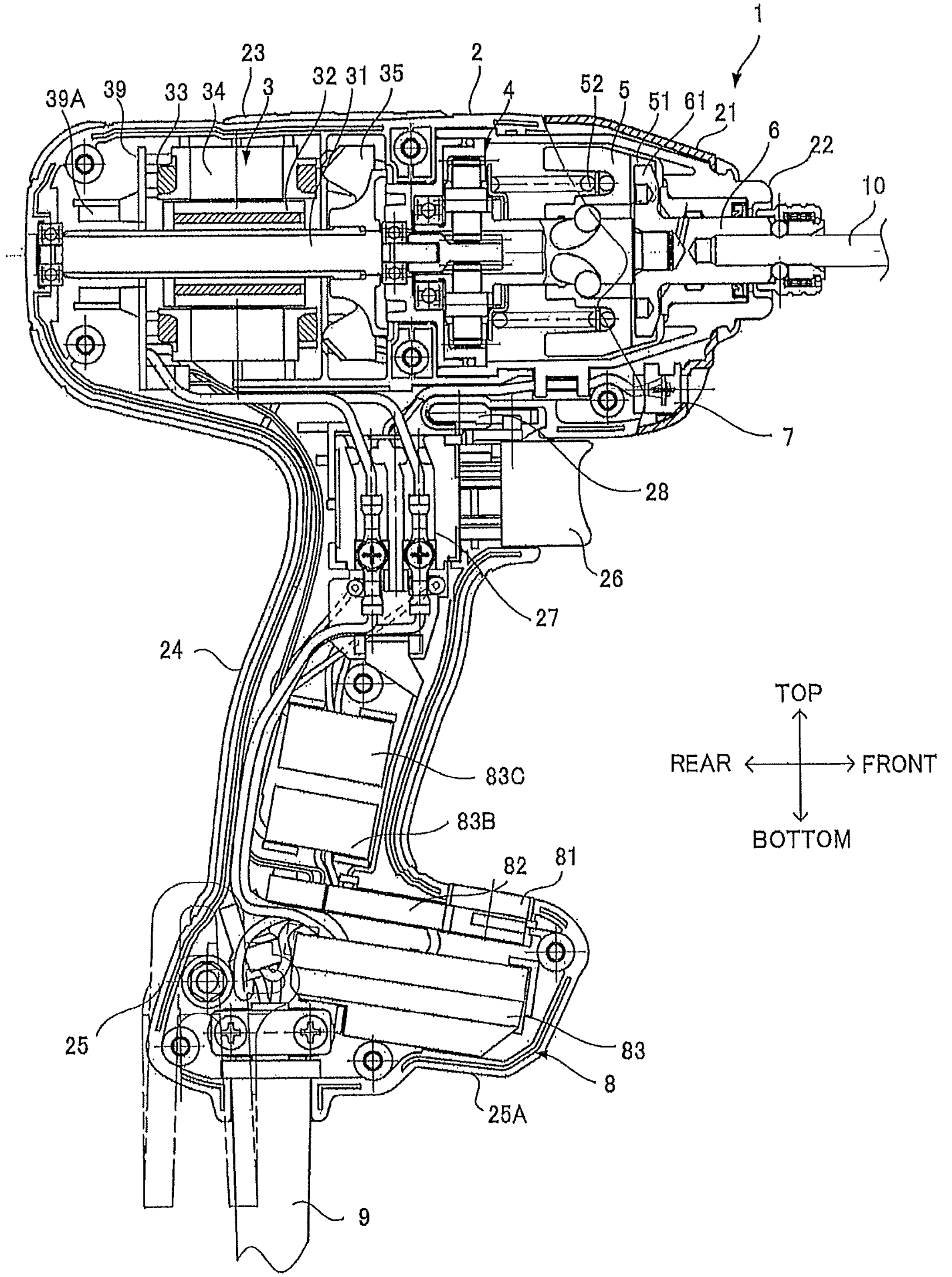
FIG. 1 is a schematic cross-sectional view of an impact driver according to an embodiment of the present invention.

As shown in FIG. 1, the impact driver 1 mainly includes a housing 2, a motor 3, a gear mechanism 4, a hammer 5, an anvil 6, a light 7, a controlling section 8, and a power cord 9. An end bit 10 is detachably mounted on the anvil 6.

Figure 2:
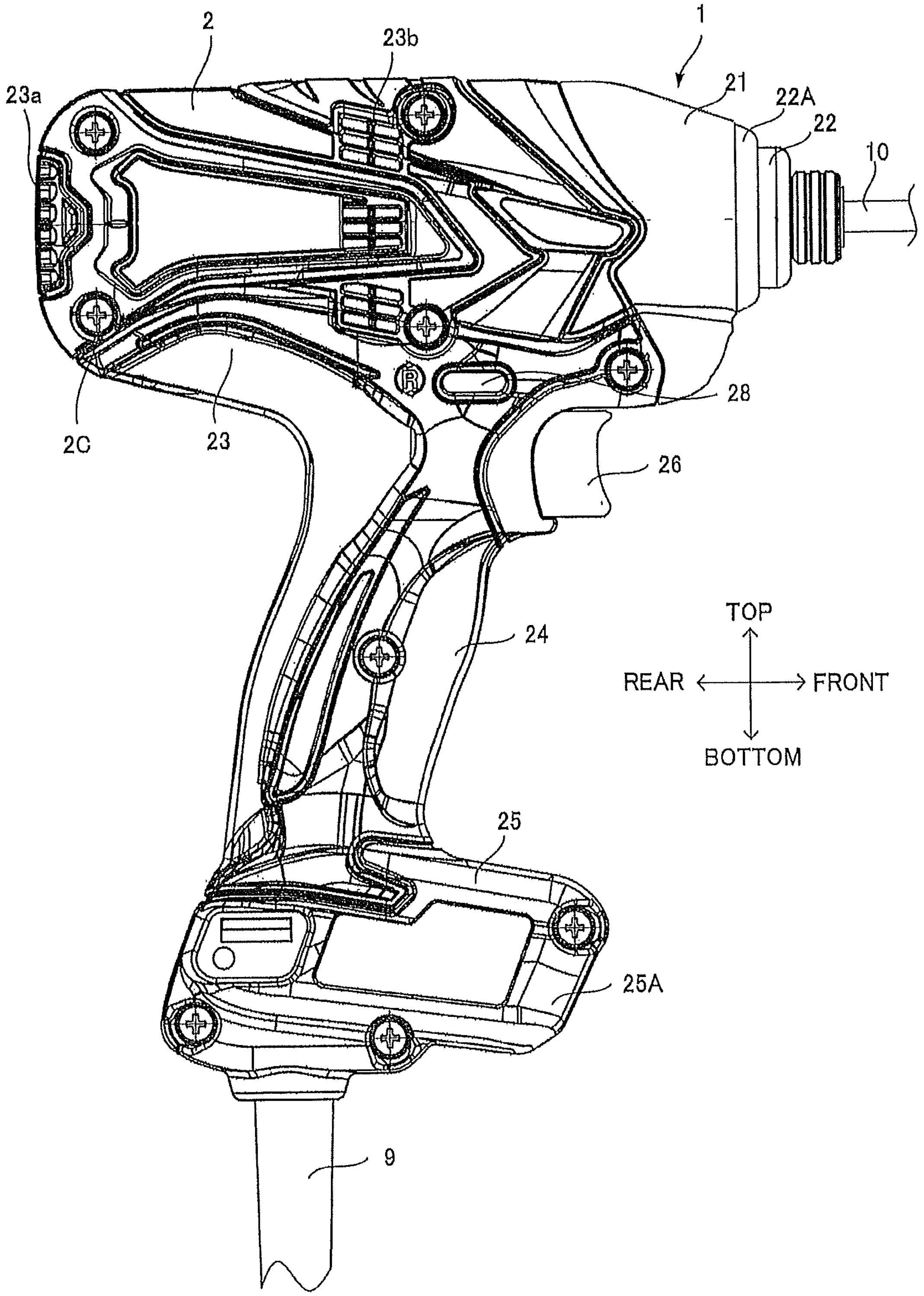
FIG. 2 is a side view showing an external appearance of the impact driver.

An outer shell of the impact driver 1 is constructed by the housing 2 and a resin-made cover 21. The cover 21 accommodates a metal-made hammer case 22, such that a part of the hammer case 22 is exposed to outside (FIG. 2). The cover 21 is fixed to the hammer case 22 by a stopper 22A. The housing 2 includes a body section 23, a handle section 24, and a board accommodating section 25. The body section 23 has substantially a cylindrical shape extending in front-to-rear direction.

In cooperation with the cover 21 and the hammer case 22, the body section 23 accommodates the motor 3, the gear mechanism 4, the hammer 5, and the anvil 6 in this order. In the following description, the anvil 6 side is defined as the front side, whereas the motor 3 side is defined as the rear side. In addition, the direction in which the handle section 24 extends from the body section 23 is defined as the lower side, whereas the opposite side is defined as the upper side. Further, the near side in the direction perpendicular to the drawing sheet of FIG. 1 is defined as the right side, whereas the opposite side is defined as the left side.

Figure 3A:
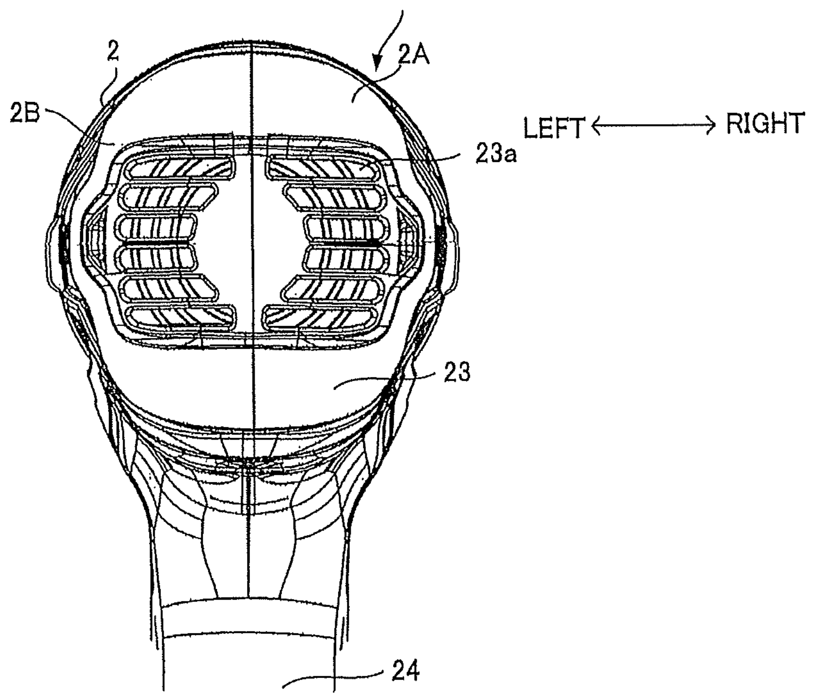
FIG. 3A is a rear view of the impact driver.
Figure 3B:
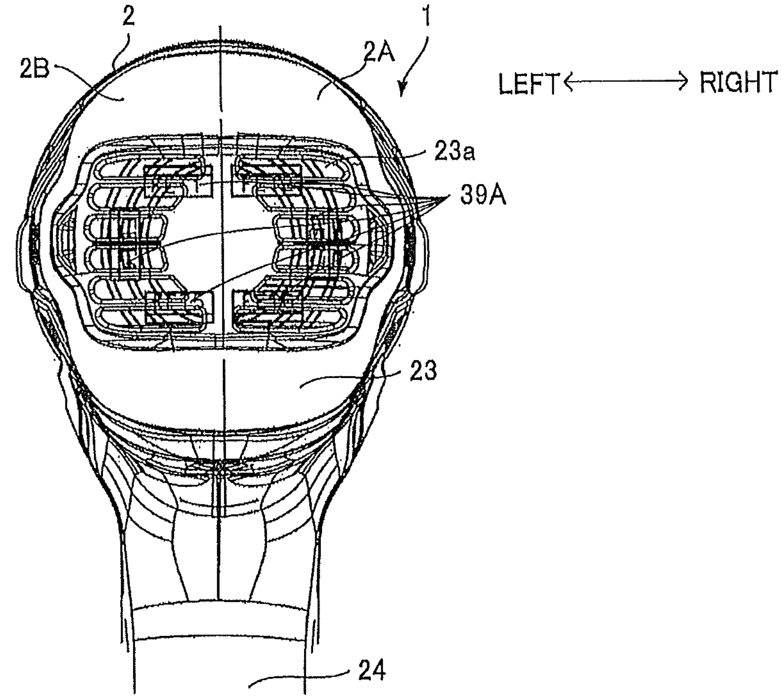
FIG. 3B is a rear view illustrating a positional relationship between a switching element and an air inlet.
Figure 4:
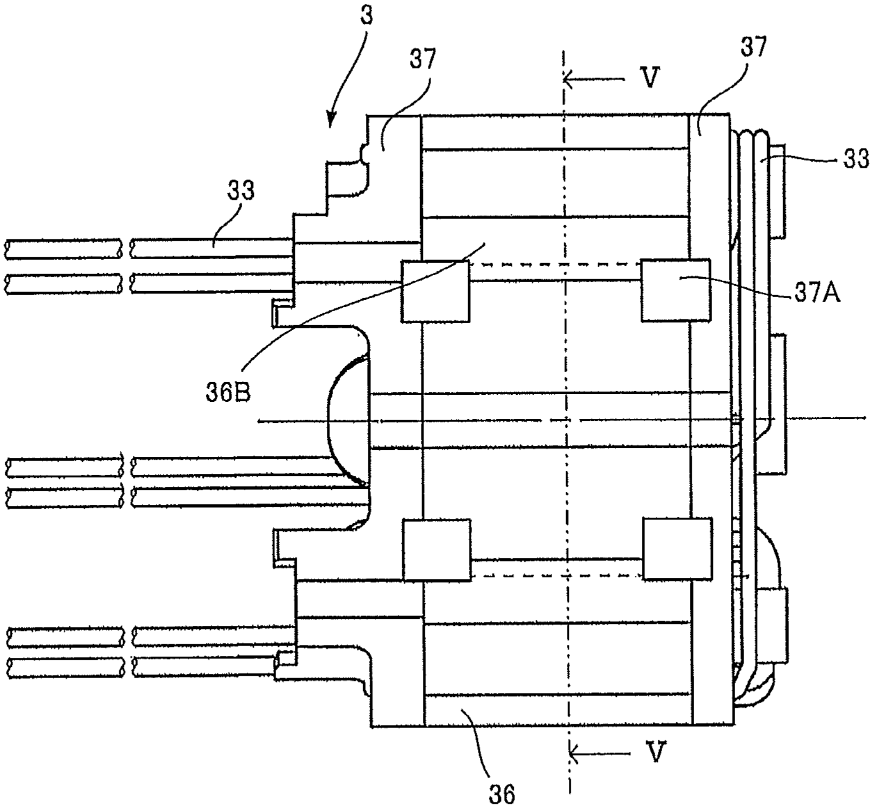
FIG. 4 is a side view showing a motor of the impact driver.

As shown in FIGS. 3A and 3B, the housing 2 is halved so that the housing can be divided into left and right sections, and is constructed from a first housing 2A constituting the right half and a second housing 2B constituting the left half. As shown in FIG. 2, the first housing 2A and the second housing 2B are fixed to each other by a plurality of screws 2C. The body section 23 has a rear end surface formed with a plurality of air inlets 23*a* for introducing external air. Each of the first housing 2A and the second housing 2B has a side surface formed with a plurality of air outlets 23*b* for discharging introduced external air. The external air is introduced in the housing 2 only from the plurality of air inlets 23*a* formed in the rear end surface of the housing 2.

The handle section 24 is provided with a trigger 26 connected with a switch mechanism 27 accommodated within the handle section 24. Supply and shutoff of electric power to the motor 3 can be switched by the trigger 26. A switch 28 for switching rotational direction of the motor 3 is provided at the connecting portion between the handle section 24 and the body section 23 immediately above the trigger 26.

The board accommodating section 25 accommodates the controlling section 8. The power cord 9 extends downward from the board accommodating section 25. The board accommodating section 25 has a protruding section 25A protruding in a direction in which the end bit 10 protrudes from the anvil 6 (in frontward direction). A striking-force display panel 81 described later is provided on a surface of the protruding section 25A at the handle section 24 side (the upper surface).

The motor 3 is a brushless motor, and includes an output shaft 31 extending in the front-rear direction, a rotor 32 fixed to the output shaft 31 and having a plurality of permanent magnets, a stator 34 disposed to surround the rotor 32 and having a plurality of coils 33, and a cooling fan 35 fixed to the output shaft 31. The detailed configuration of the motor 3 will be described later.

The gear mechanism 4 is a reducer mechanism constructed by a planetary gear train having a plurality of gears. The gear mechanism 4 reduces rotation of the output shaft 31 and transmits the rotation to the hammer 5.

The hammer 5 has a front end portion provided with an impact section 51, and the anvil 6 has a rear end portion provided with an impact receiving section 61. The hammer 5 is urged forward by a spring 52 such that the impact section 51 strikes the impact receiving section 61 in the rotational direction at rotation. With this configuration, when the hammer 5 is rotated, an impact is applied to the anvil 6.

The hammer 5 is configured to be movable rearward against the urging force of the spring 52. After an impact of the impact section 51 and the impact receiving section 61, the hammer 5 moves rearward while rotating against the urging force of the spring. Then, when the impact section 51 gets over the impact receiving section 61, elastic energy accumulated in the spring is released, and the hammer 5 rotatingly moves forward, and the impact section 51 strikes the impact receiving section 61 again.

The light 7 is held by the cover 21. The detailed configuration of the light 7 will be described later. The controlling section 8 is accommodated within the board accommodating section 25, and some elements of the controlling section 8 are also accommodated within the handle section 24. The controlling section 8 adjusts electric energy supplied to the motor 3 based on an operational amount of the trigger 26, thereby controlling the rotational speed of the motor 3. The detailed configuration of the controlling section 8 will be described later. The power cord 9 is connected with a power source (not shown), so that electric power is supplied to the motor 3 and the controlling section 8.

Figure 6:
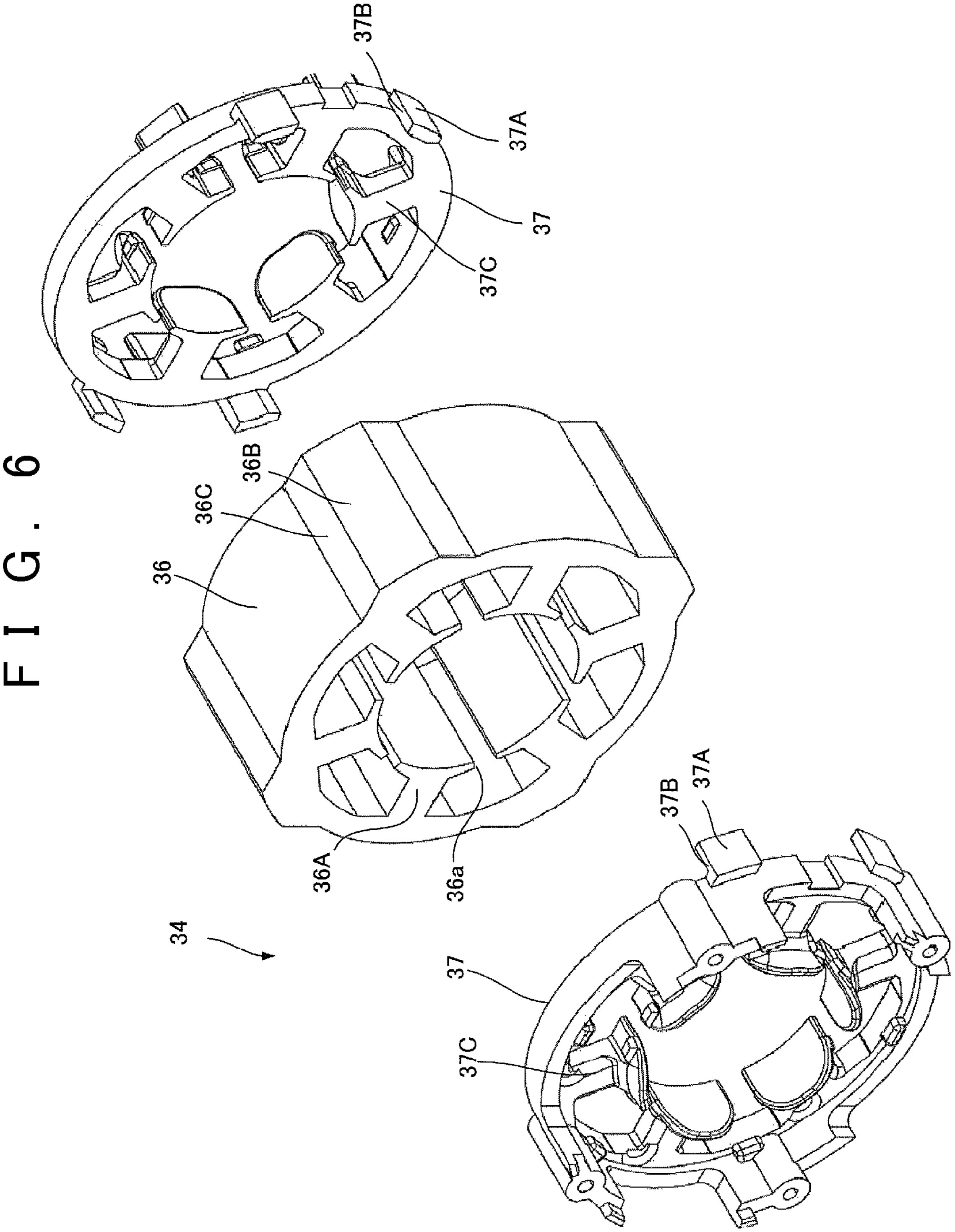
FIG. 6 is an exploded schematic perspective view of a stator of the motor.

As shown in FIG. 6, the stator 34 includes a stator core 36 having substantially cylindrical shape, and insulators 37 provided at both ends of the stator core 36 in the axial direction. The stator core 36 has an inner peripheral surface provided with six teeth 36A arranged in a circumferential direction of the stator 34 to protrude inward in a radial direction of the stator 34.

Figure 5A:
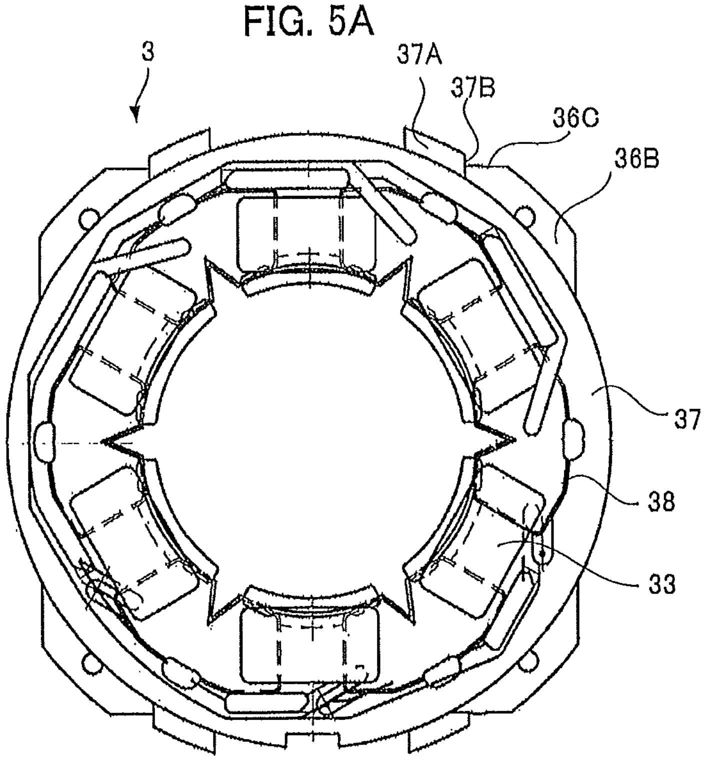
FIG. 5A is a front view of the motor.
Figure 5B:
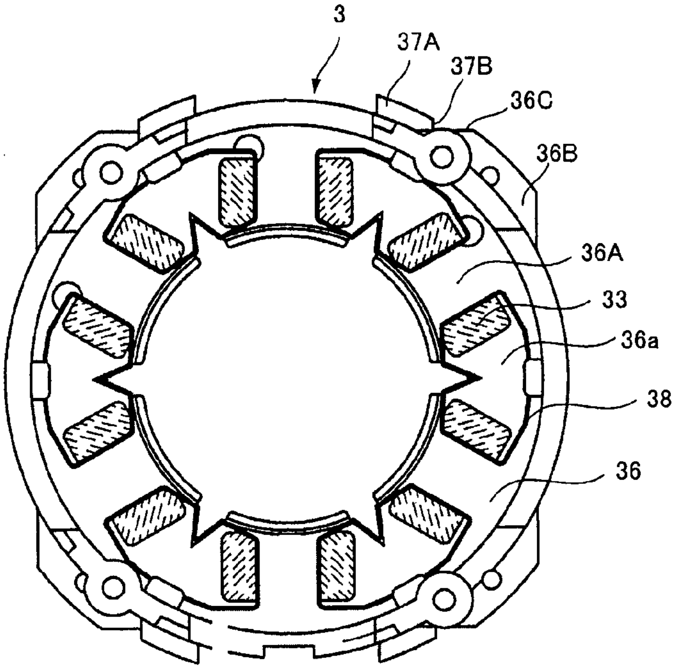
FIG. 5B is a cross-sectional view of the motor, taken along a line V-V in FIG. 4.
Figure 5C:
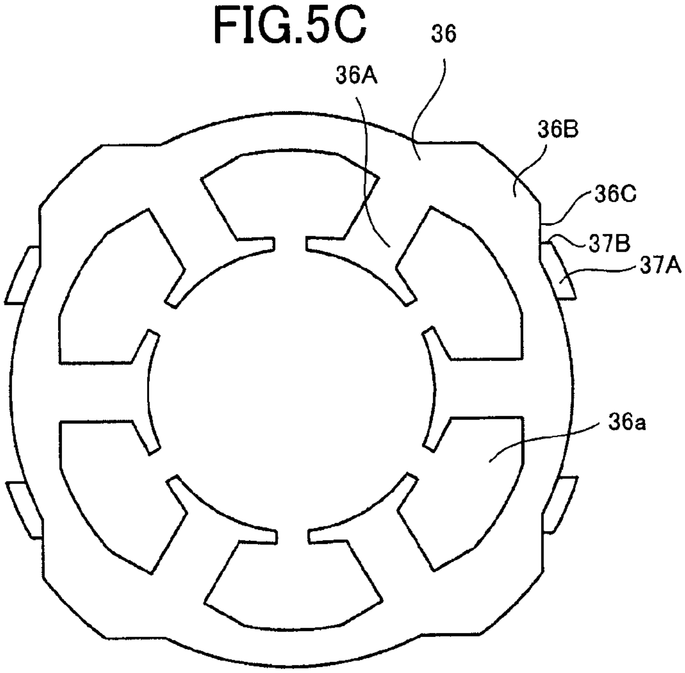
FIG. 5C is a cross-sectional view of a stator core and an insulator of the motor.

Slots 36*a* are defined between respective teeth 36A (FIG. 5C). That is, like the tooth 36A, the six slots 36*a* are formed with an arrangement in the circumferential direction. An insulating paper 38 is provided on an entirety of the inner circumferential surface of each slot 36*a* for providing insulation between the coil 33 and the stator core 36 (FIGS. 5A and 5B).

The stator core 36 has an outer circumferential surface provided with four convex portions 36B protruding outward in the radial direction. Abutment surfaces 36C, which are side surfaces in the circumferential direction, are defined on each convex portion 36B. The convex portions 36B and concave portions (not shown) formed at each of the first housing 2A and the second housing 2B fit with each other, so that the stator core 36 is supported by the housing 2. That is, the stator core 36 is supported by the housing 2 from the left and right sides. The convex portions 36B are supported by the housing 2, and also serve to fix the insulators 37 as described later.

The insulators 37 are provided at both ends of the stator core 36 in the axial direction so as to insulate the coils 33 and the stator core 36. Six insulator-side teeth 37C are provided to protrude inward in the radial direction and arranged in the circumferential direction. Each insulator 37 has an outer circumferential surface provided with four protruding portions 37A protruding outward in the radial direction. An abutment portion 37B is defined on the side surface of each protruding portion 37A in the circumferential direction, the abutment portion 37B being capable of abutting the abutment surface 36C.

In a state where the insulators 37 are mounted on the stator core 36 such that an end surface of each insulator 37 in the front-rear direction abuts an end surfaces of the stator core 36 in the front-rear direction, the abutment surface 36C abuts corresponding abutment portion 37B, and the insulators 37 are unrotatable in the circumferential direction relative to the stator core 36 (FIGS. 5A-5C). Further, because the four protruding portions 37A is tightly fitted to the stator core 36, the insulators 37 are also immovable in the axial direction relative to the stator core 36. In this state, the six teeth 36A are all aligned with respective ones of the insulator-side teeth 37C in the circumferential direction.

The coils 33 are fixed to the insulators 37. More specifically, as shown in FIG. 5A, the coil 33 starts to be wound from the insulator-side teeth 37C of one of the insulators 37 provided at the both ends of the stator core 36, passes through the slot 36*a*, is hooked at the insulator-side teeth 37C of the other insulator 37, passes through the slot 36*a*, and then reaches the one of the insulators 37 again. By repeating this action a plurality of times, the coil 33 is wound on the insulator 37. At this time, the coil 33 is reliably insulated from the stator core 36 by the insulator 37 and the insulating paper 38.

At an operation of winding the coil 33 on the insulator 37, if the positions of the insulator 37 and the stator core 36 are not aligned, the coil 33 cannot be wound. Hence, the insulator 37 and the stator core 36 need to be fixed reliably. In the present embodiment, the stator core 36 and the insulator 37 are fixed reliably by the four convex portions 36B and the four protruding portions 37A.

The cooling fan 35 is a centrifugal fan, and introduces air from the axial direction of the output shaft 31 and discharges the air outward in the radial direction. The air outlets 23*b* are formed on the body section 23 at an outward position of the cooling fan 35 in the radial direction (FIG. 2).

Figure 7A:
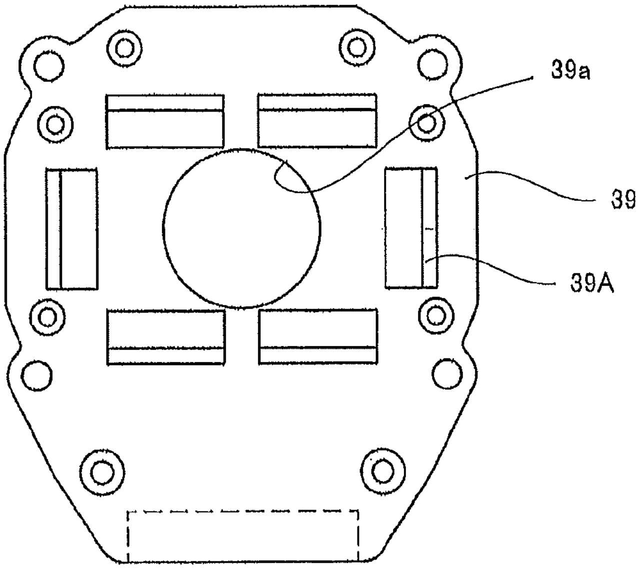
FIG. 7A is a rear view of an inverter circuit board of the impact driver.
Figure 7B:
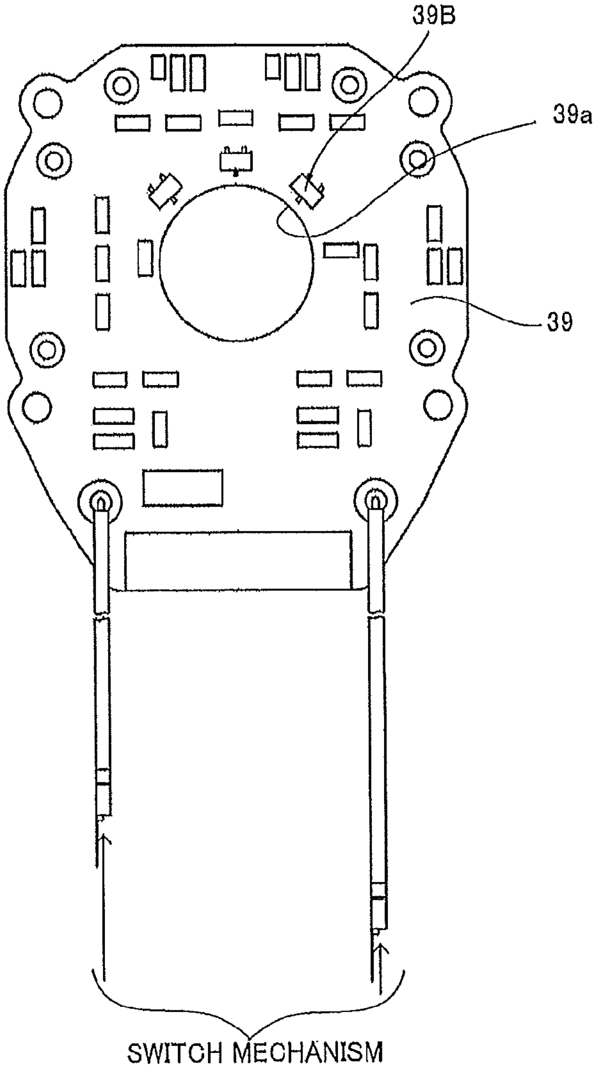
FIG. 7B is a front view of the inverter circuit board.
Figure 7C:
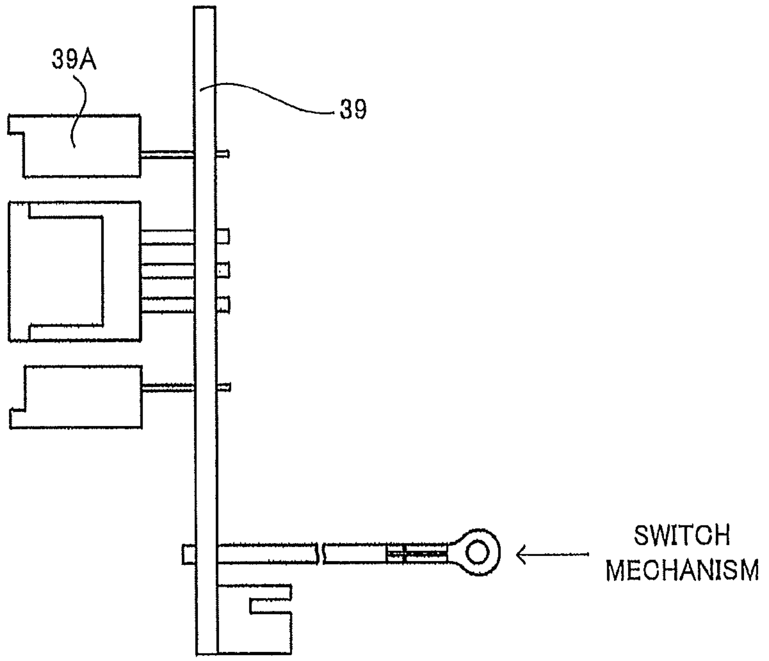
FIG. 7C is a side view of the inverter circuit board.

An inverter circuit board 39 is provided at a position between the motor 3 and the air inlets 23*a* formed in the housing 2 (that is, the rear side of the motor 3) so as to extend in the upper-lower direction. As shown in FIGS. 7A-7C, six switching elements 39A each having substantially a rectangular-parallelepiped shape and for controlling electric power supplied to the coil 33 are arranged on the inverter circuit board 39, such that a lengthwise direction of each switching element 39A is parallel with a axial direction of the output shaft 31.

The inverter circuit board 39 has a center region formed with a through hole 39*a* through which the output shaft 31 extends. Three Hall elements 39B for detecting the position of the rotor 32 are arranged with intervals of 60 degrees on a surface of the inverter circuit board 39 at the opposite side from a side at which the switching elements 39A are provided (that is, a surface at the motor side). The arrows shown in wiring in FIGS. 7B and 7C indicate the flow of electric current. That is, the arrows in FIG. 7B indicate that the inverter circuit board 39 is supplied with electric power from the switch mechanism 27. As shown in FIG. 3B, the switching elements 39A are provided at positions that overlap the air inlets 23*a* as viewed from the axial direction of the output shaft 31.

The light 7 is an LED (light emitting diode). The front side of the light 7 is supported by a plurality of ribs 21A provided at the cover 21 (FIG. 9), and the rear side is supported by the housing 2 (the body section 23) (FIG. 1). In this state, the light 7 and the hammer case 22 are spaced away from each other. Because the hammer case 22 is made of metal and its front end portion is exposed to outside (FIG. 2), there is a possibility that static electricity noise is generated at the exposed portion. However, because the light 7 and the hammer case 22 are spaced away from each other in the present embodiment, the light 7 is insusceptible to static electricity noise.

The light 7 is turned on by pressing a light button 81A to be described later, and its light travels through a hole 21*a* formed in the cover 21 (FIG. 9) and irradiates the vicinity of the end bit 10. Thus, the operator can perform operations with lights of the light 7 even at dark places.

Figure 10:
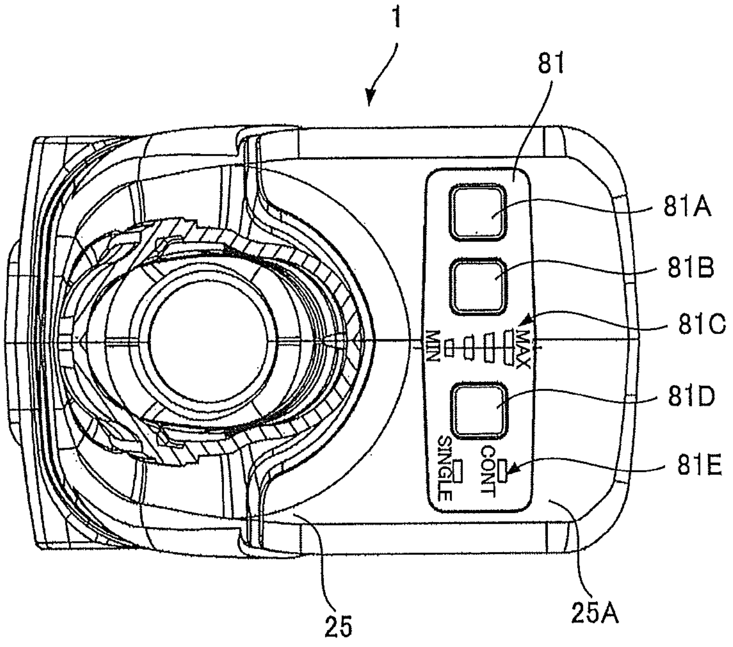
FIG. 10 is a top view of a board accommodating section of the impact driver.

The controlling section 8 includes the striking-force display panel 81, a control circuit board 82, and a power-source circuit board 83. The striking-force display panel 81 is provided on a surface of the protruding section 25A at the handle section 24 side, i.e., the top surface of the protruding section 25A. As shown in FIG. 10, the striking-force display panel 81 is provided with the light button 81A, a striking-force switching button 81B, a striking-force level display section 81C, a mode switching button 81D, and a mode display section 81E.

The operator can change the striking force of the end bit 10 by changing the rotational speed of the motor 3 with the striking-force switching button 81B. The striking force is adjustable at four steps (25%, 50%, 75%, and 100% of the rated rotational speed of the motor 3), and the set striking force is displayed at the striking-force level display section 81C. The striking force that is set once is reset when electric power from the power cord 9 is shut off. When electric power is supplied again, the striking force is reset to the strongest level (100%, all the four lamps of the striking-force level display section 81C light on).

The striking-force level display section 81C also functions as a pilot lamp. When electric power is supplied from the power cord 9, all the lamps of the striking-force level display section 81C light on. Further, even when the striking force is changed with the striking-force switching button 81B, at least one lamp of the striking-force level display section 81C is always lighted on. Thus, the operator can recognize whether the impact driver 1 is energized, by checking whether the lamp of the striking-force level display section 81C is lighted on.

More specifically, a microcomputer 82B described later determines whether the control circuit board 82 is supplied with electric power. Thus, if electric power is supplied to the power cord 9 but is not supplied to the control circuit board 82 due to malfunction of the power-source circuit board 83, the lamps of the striking-force display panel 81 do not light on. Hence, malfunction of the power-source circuit board 83 can also be recognized by checking whether the lamps of the striking-force display panel 81 are lighted on.

The mode switching button 81D is a button for switching whether the motor 3 is operated continuously (continuous) or the motor 3 is operated singly (single). If the mode is set to "continuous", the motor 3 is operated continuously while the trigger 26 is pulled. At this time, a "continuous" lamp of the mode display section 81E is lighted on. Meanwhile, if the mode is set to "single", the motor 3 stops after the hammer 5 and the anvil 6 strike each other a predetermined number of times. The control circuit board 82 is provided with a shock sensor 82A described later. Vibrations are detected with the shock sensor 82A, and the number of times the hammer and the anvil 6 strike each other is detected based on the vibrations. At this time, a "single" lamp of the mode display section 81E is lighted on.

Figure 11A:
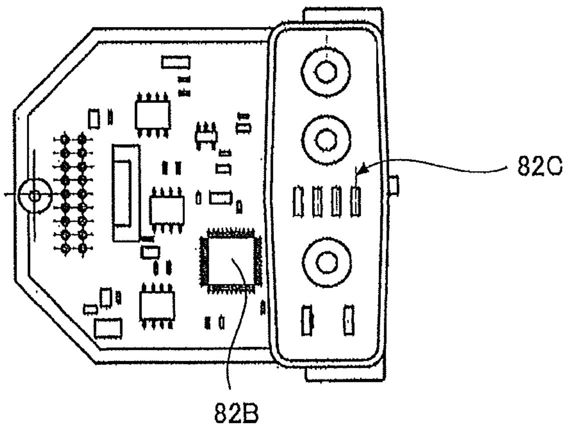
FIG. 11A is a top view of a control circuit board of the impact driver.
Figure 11B:
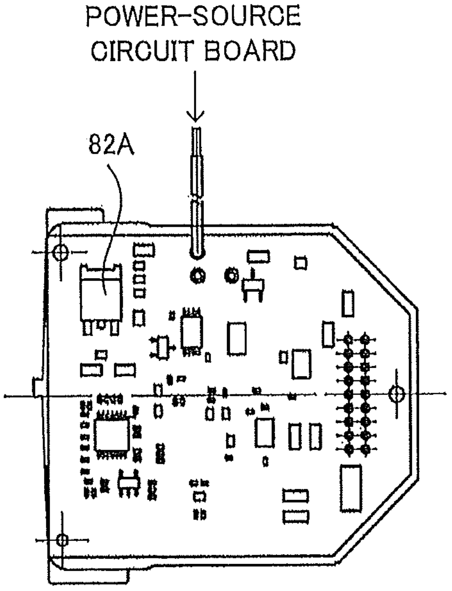
FIG. 11B is a bottom view of the control circuit board.

The control circuit board 82 is disposed within the board accommodating section 25 and at a position closest to the handle section 24 (FIG. 1). The striking-force display panel 81 is located immediately above the control circuit board 82. As shown in FIGS. 11A and 11B, the control circuit board 82 includes the shock sensor 82A for detecting the number of times that the hammer 5 and the anvil 6 strike each other, the microcomputer 82B that controls the entirety of the impact driver 1, and a panel control section 82C that controls the striking-force display panel 81. The panel control section 82C includes a plurality of buttons and LEDs, and the arrangement of each element corresponds to the arrangement of each button and display section on the striking-force display panel 81 (FIG. 10). The outer surface of the control circuit board 82 is covered by silicone for insulation.

Figure 13:
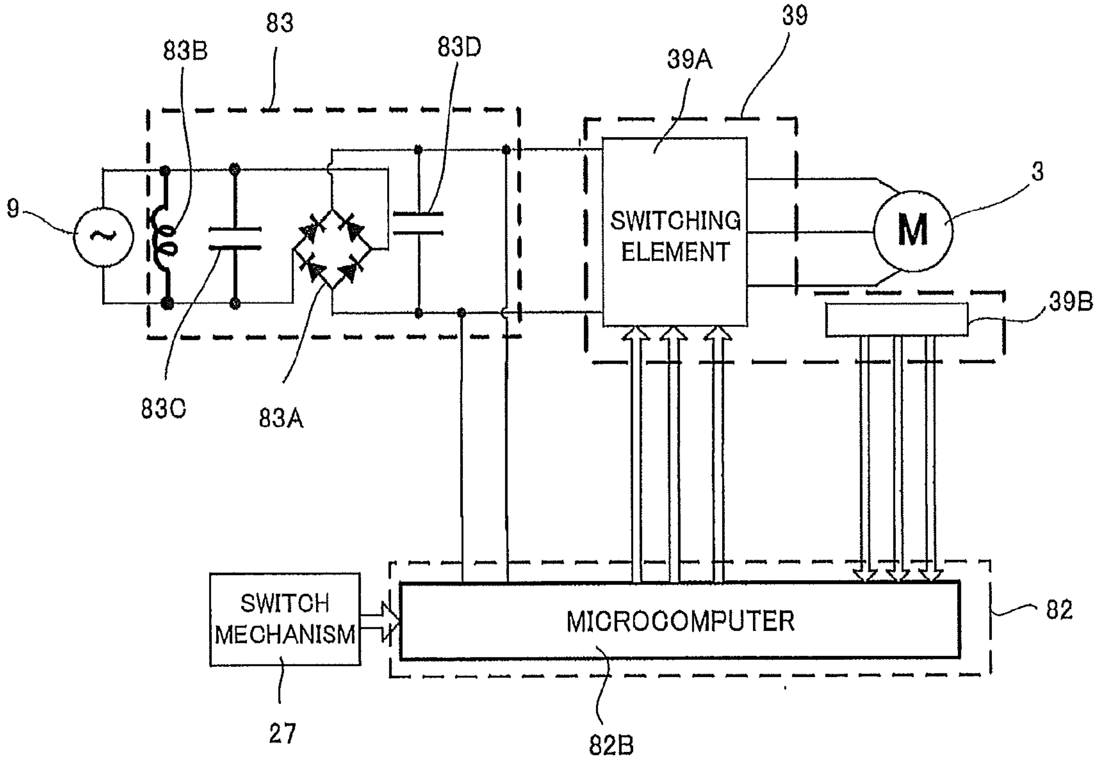
FIG. 13 is a block diagram illustrating a control system of the impact driver.

As shown in FIG. 13, the microcomputer 82B is connected with the switch mechanism 27, and controls the rotational speed of the motor 3 in accordance with a pulled amount of the trigger 26 that is inputted from the switch mechanism 27. More specifically, the microcomputer 82B receives signals from the Hall elements 39B and outputs, to the switching elements 39A of the inverter circuit board 39, PWM (Pulse Width Modulation) control signals for driving the switching elements 39A of the inverter circuit board 39.

Figure 12A:
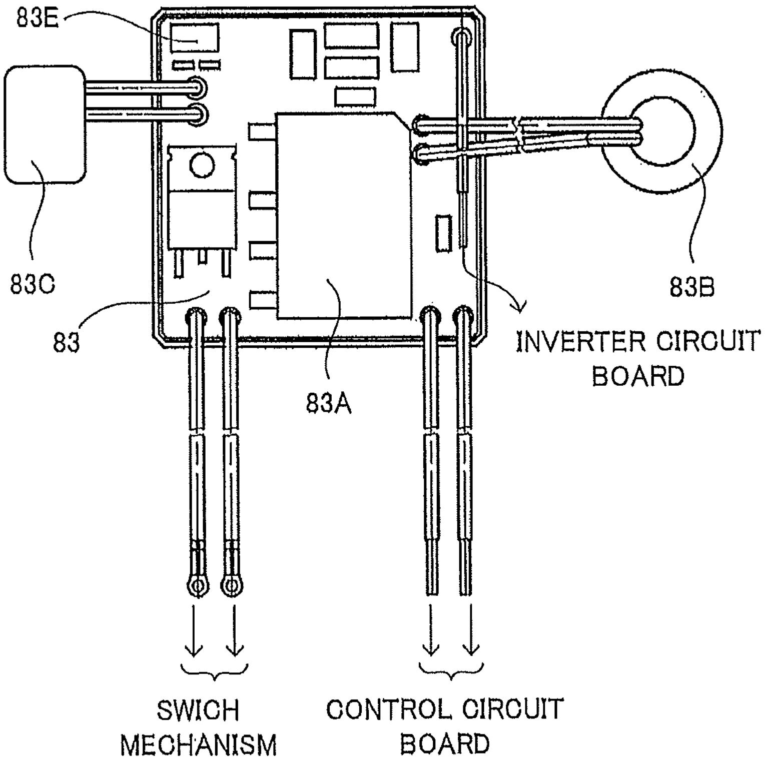
FIG. 12A is a top view of a power-source circuit board of the impact driver.
Figure 12B:
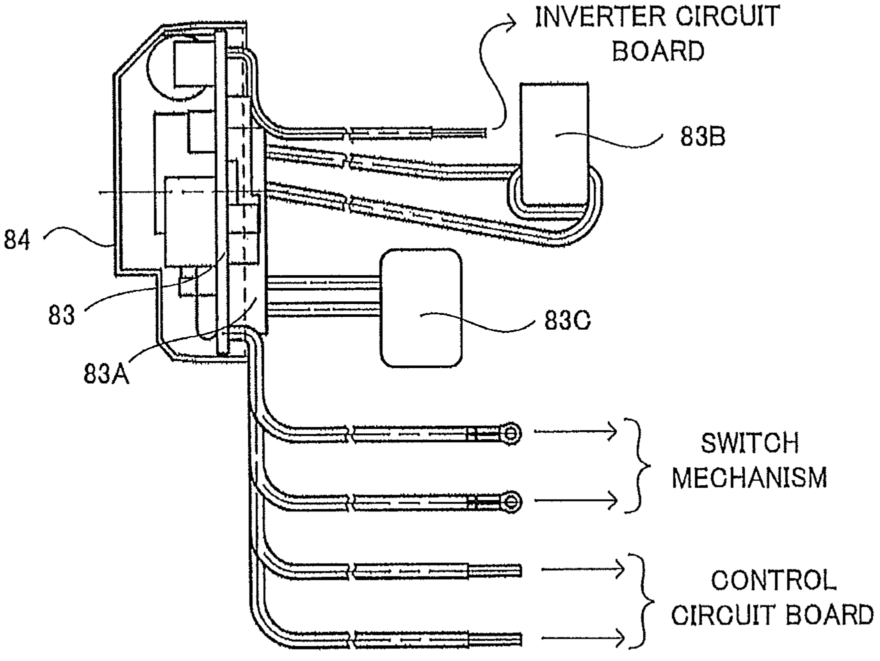
FIG. 12B is a side cross-sectional view of the power-source circuit board.

The power-source circuit board 83 is disposed within the board accommodating section 25 between the power cord 9 and the control circuit board 82 (FIG. 1). As shown in FIGS. 12A and 12B, the power-source circuit board 83 includes a diode bridge 83A for full-wave rectifying AC power supplied from the power cord 9, a choke coil 83B for removing noises generated from an AC 100V power supplied from the power cord 9, a first capacitor 83C for removing noises generated by the switching elements 39A (FIG. 13), a second capacitor 83D for smoothing full-wave rectified current, and an IPD element 83E for creating power to be supplied to the control circuit board 82.

The arrows shown in wiring in FIGS. 12A and 12B indicate the flow of electric current. An outer surface of the power-source circuit board 83 is covered by a case 84 having substantially a C-shape opening upward in cross-section. The case 84 is filled with urethane. In other words, the power-source circuit board 83 and each element on the power-source circuit board 83 are fixed by urethane and, at the same time, electrical insulation, vibration insulation, and waterproof protection are performed. Because the case 84 is filled with urethane, the power-source circuit board 83 is heavier than the other boards.

The diode bridge 83A has a rectangular parallelepiped shape, and is disposed on the power-source circuit board 83 such that its lengthwise direction is parallel with the power-source circuit board 83. This arrangement can minimize a space occupied by the power-source circuit board 83 within the board accommodating section 25. The volumes and weights of the choke coil 83B and the first capacitor 83C are larger than the other elements, and the choke coil 83B and the first capacitor 83C are accommodated in the handle section 24 (FIG. 1). In the present embodiment, the first capacitor 83C uses a film capacitor that does not tend to generate heat in order to prevent a temperature increase in the handle section 24.

In the impact driver 1, metal-made components such as the motor 3 and the gear mechanism 4 are arranged at one end side (the upper side) of the handle section 24 gripped by the operator, the power-source circuit board 83 and the control circuit board 82 that are relatively heavy among the boards are arranged at the other end side (the lower side), and the choke coil 83B and the first capacitor 83C that are heavy elements are arranged at positions near the board accommodating section 25 side within the handle section 24, thereby well maintaining a weight balance of the entire impact driver 1. Specifically, each component is arranged such that the center of gravity is located immediately above the handle section 24 gripped by the operator.

The AC 100V power supplied from the power cord 9 is rectified by the diode bridge 83A, and then a part of the power is lowered in voltage to 18V by the IPD element 83E and is supplied to the control circuit board 82 as driving power. The remaining power is increased in voltage to 140V as driving power of the motor 3, and is supplied to the inverter circuit board 39 via the switch mechanism 27. Within the housing 2, the power cord 9, the power-source circuit board 83, the control circuit board 82, the switch mechanism 27, and the inverter circuit board 39 are accommodated from the lower side to the upper side in this order. In this way, because the flow of current from the power cord 9 to the motor 3 matches the arrangement of each component within the housing 2, wiring among each board can be performed efficiently.

The operations of the impact driver 1 will be described. By connecting the power cord 9 with a power source (not shown), driving power is supplied to the microcomputer 82B of the control circuit board 82, and all the lamps of the striking-force level display section 81C light on. When the operator pulls the trigger 26 in this state, the motor 3 rotates at a rotational speed in accordance with the pulled amount. The cooling fan 35 also rotates at the same time to introduce external air through the air inlets 23*a*. The external air cools the switching elements 39A, the inverter circuit board 39, and the motor 3, and is discharged to outside through the air outlets 23*b*. Rotation of the motor 3 causes the hammer 5 to strike the anvil 6 and to rotate the end bit 10. When the operator releases the trigger 26, the motor 3 stops. When the power cord 9 is pulled out of the power source (not shown), the lamps of the striking-force level display section 81C are turned off.

According to the above-described configuration, because the striking-force level display section 81C is provided at the handle section 24 side of the protruding section 25A, the operator can easily check the display of the striking-force level display section 81C.

According to the above-described configuration, because the striking-force switching button 81B is provided on the striking-force level display panel 81, the operator can grip the handle section 24 with one hand, while he can operate the striking-force switching button 81B with the other hand.

According to the above-described configuration, all the time electric power is supplied to the power cord 9, the microcomputer 82B controls the striking-force level display section 81C to light on. Thus, a pilot lamp need not to be newly provided, and the number of components can be reduced.

According to the above-described configuration, electric power from the power cord 9 is converted into DC power by the power-source circuit board 83 and is supplied to the control circuit board 82. Because the power cord 9, the power-source circuit board 83, and the control circuit board 82 are accommodated within the board accommodating section 25 in this order, these components are arranged in the order in which electric power is supplied. With this arrangement, wiring in the board accommodating section 25 can be minimized, and the space within the board accommodating section 25 can be utilized efficiently. In addition, the board accommodating section 25 can be downsized.

Further, the motor 3, the gear mechanism 4, and the like having large weights are arranged at one end side of the handle section 24 gripped by the operator, while the power-source circuit board 83 and the control circuit board 82 including elements having relatively large weights are arranged at the other end side. This leads to a good weight balance when the operator grips the handle section 24, thereby achieving the impact driver 1 that causes less fatigue even at an operation for a long time.

According to the above-described configuration, because the microcomputer 82B is mounted on the control circuit board 82, the microcomputer 82B can control the rotational speed of the motor 3 so that strength of striking force can be finely changed depending on situations.

According to the above-described configuration, the motor 3 is accommodated within the body section 23 and the power-source circuit board 83 is accommodated within the board accommodating section 25. A wiring for supplying electric power to the motor 3 is connected from the board accommodating section 25 with the motor 3 in the body section 23 via the handle section 24. Because the trigger 26 is provided on the handle section 24 that is located between the board accommodating section 25 and the body section 23, each component is arranged within the housing 2 in the order in which electric power is supplied. Thus, the space within the housing 2 can be utilized efficiently. With this arrangement, the impact driver 1 can be downsized.

According to the above-described configuration, because the choke coil 83B and the first capacitor 83C having relatively large weights are accommodated close to the board accommodating section 25 within the handle section 24, a good weight balance is achieved when the operator grips the handle section 24, thereby obtaining the impact driver 1 that causes less fatigue even at an operation for a long time. Further, the board accommodating section 25 can be downsized by efficiently utilizing the space within the handle section 24.

Figure 8A:
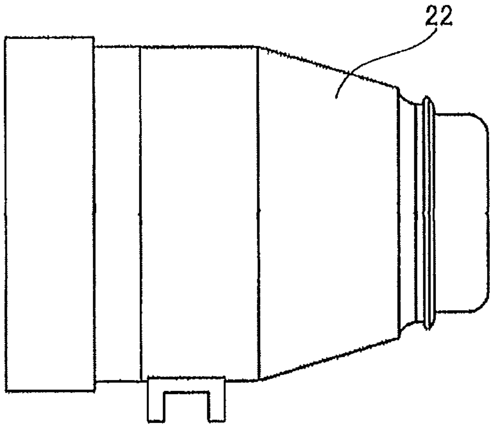
FIG. 8A is a side view of a hammer case of the impact driver.
Figure 8B:
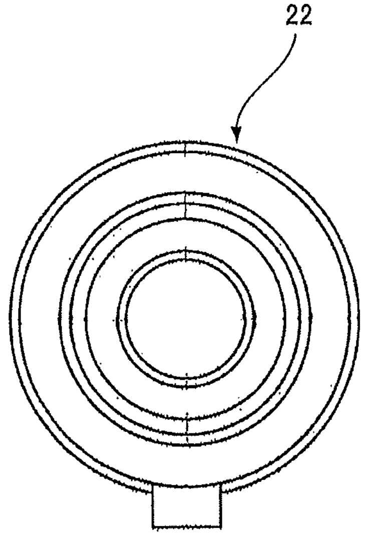
FIG. 8B is a front view of the hammer case.
Figure 8C:
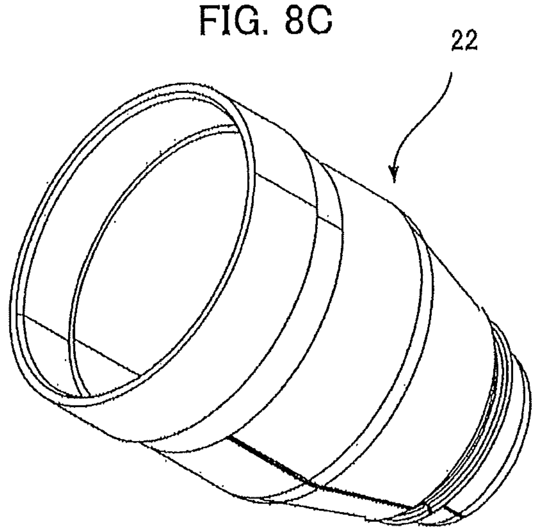
FIG. 8C is a rear perspective view of the hammer case.
Figure 9:
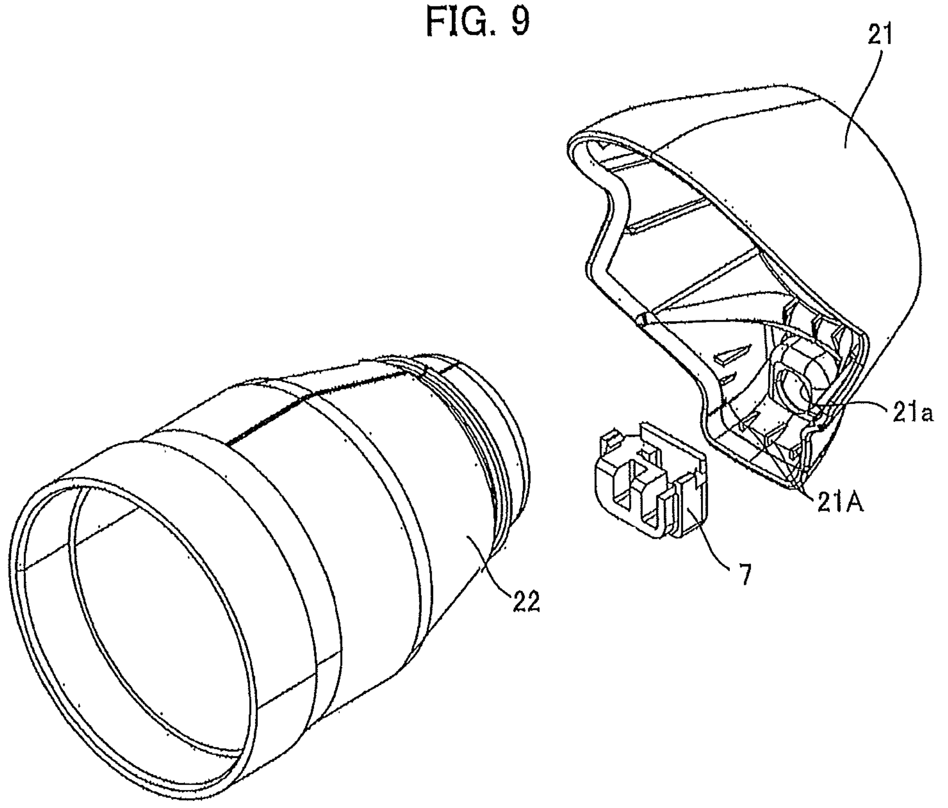
FIG. 9 is an exploded perspective view of a light, a cover, and the hammer case.
Figure 16A:
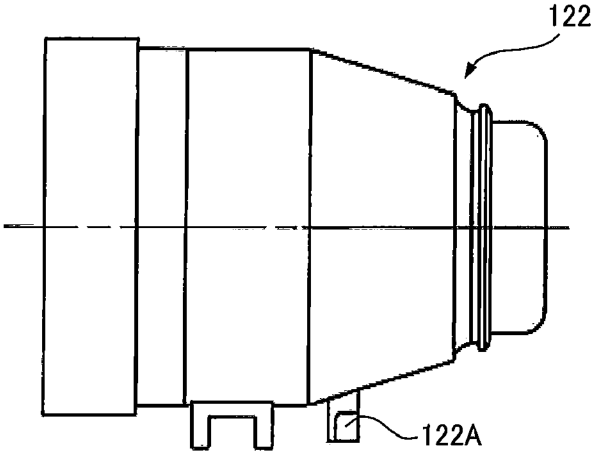
FIG. 16A is a side view of a hammer case of a conventional impact driver.
Figure 16B:
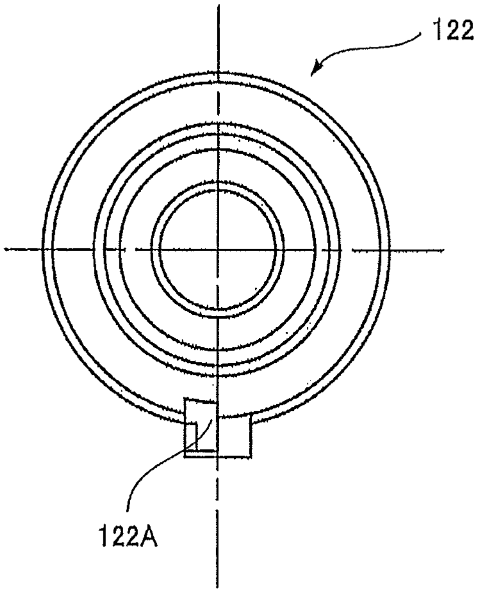
FIG. 16B is a front view of the hammer case of the conventional impact driver.
Figure 16C:
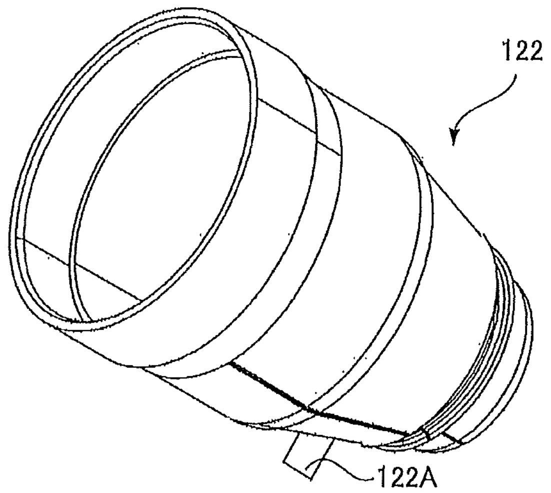
FIG. 16C is a perspective view of the hammer case of the conventional impact driver.

According to the above-described configuration, the light 7 is held by the cover 21, and is not held by the metal-made hammer case 22. Thus, even if static electricity noise or the like is generated at the hammer case 22, the static electricity noise does not affect the light 7. This can prevent damage of the light 7 due to static electricity noise. Further, because a conventional hammer case 122 shown in FIGS. 16A-16C is provided with a light supporting member 122A for supporting the light 7, static electricity noise concentrates on this part. In the present embodiment, however, as shown in FIGS. 8A-8C, a member for holding the light 7 at the hammer case 22 is unnecessary. Hence, concentration of static electricity noise on this member can be prevented. Thus, the hammer case 22 can be made in a shape that is less subject to charging by static electricity noise.

According to the above-described configuration, because the light 7 is held by the housing 2 and the cover 21, the light 7 can be held more firmly.

According to the above-described configuration, because the cover 21 is made of resin, reliability in insulation of static electricity noise against the light 7 can be improved.

According to the above-described configuration, because the stator core 36 and the insulators 37 fit with each other by abutment of the convex portions 36B and the protruding portions 37A, the insulators 37 can be fixed to the stator core 36 without forming a hole or the like in the stator core 36. Because this arrangement can prevent a decrease in magnetic flux due to the hole in the stator core 36, motor power can be improved with a motor having the same size as conventional motors. Further, because the motor 3 can be downsized, the product can also be downsized.

According to the above-described configuration, because the plurality of protruding portions 37A is provided, the stator core 36 and the insulators 37 can be fixed to each other more firmly.

According to the above-described configuration, the convex portions 36B are provided on the outer circumferential surface of the stator core 36, and the protruding portions 37A are provided on the outer surface of the insulators 37 in the radial direction. Thus, the inner space of the stator core 36 can be utilized effectively, compared with the case where these are provided inside the stator core 36. This can increase the number of windings of the coil 33 and increase the motor power. Then, because the motor 3 can be downsized, the impact driver 1 can also be downsized.

According to the above-described configuration, because the stator core 36 is supported at the first housing 2A and the second housing 2B by the convex portions 36B, the convex portions 36B are used as members for fixing the insulators 37 to the stator core 36, and are also used as members for fixing the stator core 36 to the housing 2. Thus, the stator core 36 can be fixed to the housing 2, without newly providing a fixing member.

According to the above-described configuration, because the insulating paper 38 is provided over an entirety of the inner circumferential surface of the slots 36*a*, the stator core 36 and the coils 33 can be insulated reliably from each other by the insulating paper 38. Further, compared with the case where the stator core 36 and the coils 33 are insulated by the insulators 37, a larger space within the slot 36*a* can be ensured when the insulating paper 38 is used for insulation, and the number of windings of the coils 33 can be increased. Because this arrangement can improve the motor power and downsize the motor 3, the impact driver 1 can also be downsized.

According to the above-described configuration, the air inlets 23*a* are formed only at the opposite side from the hammer 5 with respect to the motor 3. Hence, collision of airflow can be avoided, compared with the case where the air inlets 23*a* are formed at a plurality of locations. With this arrangement, external air can be introduced smoothly, and cooling efficiency of the motor 3 can be improved.

According to the above-described configuration, because the switching elements 39A are arranged between the air inlets 23*a* and the motor 3, the switching elements 39A can also be cooled by rotation of the cooling fan 35.

According to the above-described configuration, because the lengthwise direction of the switching elements 39A is parallel with the axial direction of the motor 3, the switching elements 39A can be cooled efficiently.

According to the above-described configuration, because the air inlets 23*a* and the switching elements 39A are arranged to overlap each other as viewed from the axial direction, the switching elements 39A can be cooled efficiently.

While the invention has been described in detail with reference to the above aspects thereof, it would be apparent to those skilled in the art that various changes and modifications may be made therein without departing from the scope of the claims.

In the above-described embodiment, the impact driver 1 is described as an example of the power tool according to the invention. However, the invention is not limited to an impact driver, provided that a power tool includes a brushless motor and is driven by AC power source. For example, the power tool of the invention may be a driver drill having a clutch, a hammer drill having a reciprocal striking mechanism, an oil-pulse driver having a hydraulic striking mechanism, or the like.

In the above-described embodiment, a planetary gear train is used as the gear mechanism 4. However, the gear mechanism 4 is not limited to the planetary gear train. Further, a reduction mechanism need not be provided.

Figure 14:
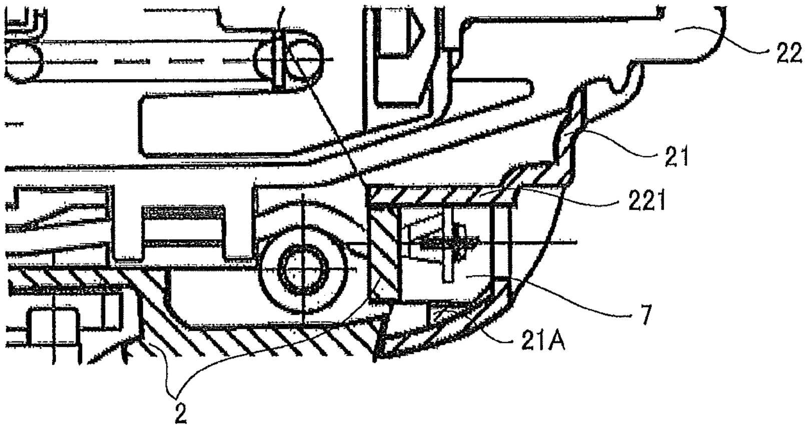
FIG. 14 is a partial enlarged cross-sectional view around a light of an impact driver according to a first modification of the present invention.

In the above-described embodiment, although the front side of the light 7 is supported by the cover 21, the configuration is not limited to this. As shown in FIG. 14, the cover 21 may include a light cover section 221, and the light cover section 221 may be disposed between the light 7 and the cover 21. With this arrangement, reliability in insulation of static electricity noise against the light 7 can be further improved.

Figure 15:
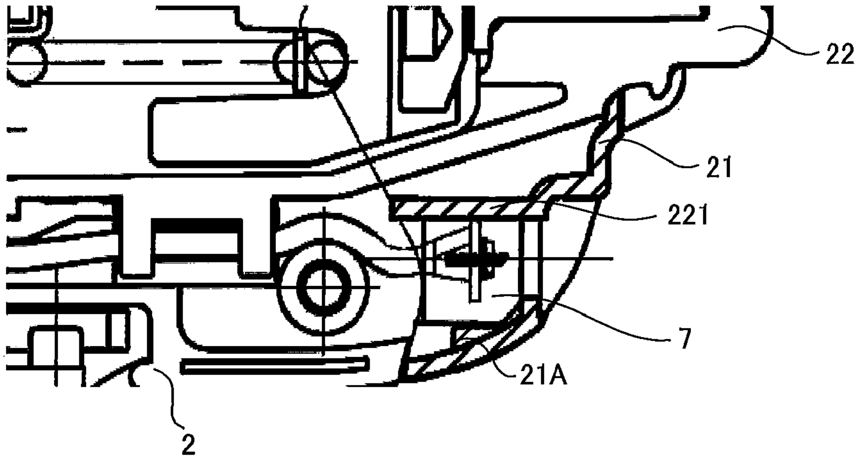
FIG. 15 is a partial enlarged cross-sectional view around a light of the impact driver according to a second modification of the present invention.

In the above-described embodiment, although the rear side of the light 7 is supported by the housing 2, the configuration is not limited to this. For example, as shown in FIG. 15, the light 7 may be sandwiched by the light cover section 221 and the rib 21A from the upper and lower directions. With this arrangement, the light 7 is separated from the housing 2, and the cover 21 is in contact with the housing 2, thereby preventing vibrations during an operation from transmitting to the light 7 via the housing 2. Thus, damage of the light 7 can be prevented.

In the above-described embodiment, although the four convex portions 36B are provided at the stator core 36, the number of the convex portions 36B is not limited to this. Further, in the above-described embodiment, although the four protruding portions 37A are provided at the insulator 37, the number of the protruding portions 37A is not limited to this. For example, one protruding portion may be provided, and two convex portions may be provided to sandwich the protruding portion. This arrangement can prevent the insulator from rotating relative to the stator core.

In the above-described embodiment, the convex portions 36B are provided on the outer circumferential surface of the stator core 36, and the protruding portions 37A are provided on the outer circumferential surface of the insulator 37. However, the configuration is not limited to this. For example, the convex portions may be provided on the inner circumferential surface of the stator core, and the protruding portions may be provided on the inner circumferential surface of the insulator. Further, the protruding portion of the stator core may be provided on the abutment surface of the insulator and the stator core, and a concave portion fitting with the protruding portion may be provided at the insulator. With this arrangement, too, a decrease in magnetic flux can be suppressed because a hole need not be formed in the stator core.

In the above-described embodiment, although the striking-force level display section 81C functions as the pilot lamp, the configuration is not limited to this. For example, the mode display section 81E may be lighted on, serving as the pilot lamp, when power is supplied to the power cord 9. Further, the light 7 may function as the pilot lamp.

In the above-described embodiment, although the cover 21 is made of resin, the cover 21 may be made of other material as long as it is insulating material. For example, the cover 21 may be made of rubber.

In the above-described embodiment, although the microcomputer 82B determines whether the power cord 9 is supplied with power, determination of energization may be performed by another component. For example, determination of energization may be performed by an element provided on the power-source circuit board.

In the above-described embodiment, although the switching elements 39A are arranged at the rear of the motor 3, the arrangement of the switching elements is not limited to this. For example, the switching elements may be provided at the power-source circuit board 83, or may be provided at the control circuit board 82.

What is claimed is:

1. A power tool comprising:

a motor;

an output unit configured to be driven by the motor;

a circuit board configured to control the motor, and comprising:

a power-source circuit board configured to convert AC voltage into DC voltage and extending in a first extending direction, the power-source circuit board having a first end and a second end in the first extending direction, the first end of the power-source circuit board being positioned frontward of the second end; and a control circuit board extending in the first extending direction, the control circuit board having a first end and a second end in the first extending direction, the first end of the control circuit board being positioned frontward of the second end, the DC voltage being supplied from the power-source circuit board to the control circuit board;

a housing comprising:

a body section accommodating the motor and a part of the output unit;

a board accommodating section accommodating the circuit board and extending in the first extending direction, the board accommodating section having a first end and a second end in the first extending direction, the first end of the board accommodating section being positioned frontward of the second end; and a handle section extending in a second extending direction across the first extending direction, the handle section having a first end portion connected to the body section and a second end portion connected to the board accommodating section in the second extending direction, the handle section comprising a portion including the first end portion and a remaining portion including the second end portion, the first end of the power-source circuit board being positioned frontward of the handle section, the first end of the control circuit board being positioned frontward of the handle section, the first end of the board accommodating section being positioned frontward of the handle section;

a power cord extending from the board accommodating section and supplying the AC voltage to the power-source circuit board, the power cord being positioned opposed to the handle section with respect to the board accommodating section;

a choke coil configured to remove noises and connected to the power-source circuit board; and a capacitor configured to remove noises and connected to the power-source circuit board, the capacitor being in electrical connection with the power-source circuit board via a wiring, the capacitor being separated from the power-source circuit board, wherein the control circuit board is located at a position close to the handle section in the board accommodating section, and the power-source circuit board is located between the control circuit board and the power cord, and wherein the choke coil and the capacitor are accommodated in the remaining portion of the handle section, and are arranged side by side in the second extending direction.

2. The power tool as claimed in claim 1, wherein the control circuit board is provided with a microcomputer configured to control a rotational speed of the motor, and wherein the power-source circuit board is provided with an IPD element configured to lower the DC voltage, the DC voltage lowered by the IPD element being supplied to the microcomputer as driving power.

3. The power tool as claimed in claim 1, wherein the portion of the handle section is provided with a trigger configured to switch supply and shutoff of the DC voltage supplied to the motor, and wherein the capacitor is disposed between the trigger and the control circuit board.

4. The power tool as claimed in claim 3, wherein the housing accommodates the motor, the trigger, the capacitor, the choke coil, the control circuit board, the power-source circuit board, and the power cord such that a center gravity is located above the handle section.

5. The power tool as claimed in claim 1, wherein the power-source circuit board is located immediately below the control circuit board.

6. The power tool as claims in claim 5, wherein the power-source circuit board is offset from at least part of the power cord in the first extending direction.

7. The power tool as claimed in claim 1, wherein the power-source circuit board is offset from at least part of the power cord in the first extending direction.

8. The power tool as claimed in claim 1, wherein the control circuit board is offset from at least part of the power cord in the first extending direction.

9. The power tool according to claim 1, wherein the power cord is located immediately below the power-source circuit board in the second extending direction.

10. The power tool according to claim 1, further comprising a switching element configured to control electric power supplied to the motor, and a transmitting unit configured to transmit a rotation of the motor to the output unit, wherein the motor is a brushless motor, wherein the motor, the transmitting unit, and a part of the output unit are arranged in this order in the body section, wherein the body section has one side portion and another side portion opposite to each other in an extending direction in which the body section extends, the one side portion of the body section accommodating the part of the output unit, and wherein the switching element is accommodated in the another side portion of the body section.

* * * * *